(12) United States Patent
Moore (10) Patent No.: US 6,847,938 B1
(45) Date of Patent: Jan. 25, 2005

(54) METHOD OF EXCHANGING GOODS OVER THE INTERNET

(76) Inventor: Donna R. Moore, 37 Joe's Hill Rd., Danbury, CT (US) 06811

( * ) Notice: Subject to any disclaimer, the term of this patent is extended or adjusted under 35 U.S.C. 154(b) by 0 days.

(21) Appl. No.: 09/399,366

(22) Filed: Sep. 20, 1999

(51) Int. Cl.$^7$ .............................................. G06F 17/60
(52) U.S. Cl. .............................. 705/26; 705/27; 705/37
(58) Field of Search .............................. 705/26, 27, 37

(56) References Cited

U.S. PATENT DOCUMENTS

| | | | |
|---|---|---|---|
| 4,674,044 A | | 6/1987 | Kalmus et al. |
| 4,799,156 A | | 1/1989 | Shavit et al. |
| 4,903,201 A | | 2/1990 | Wagner |
| 4,941,090 A | | 7/1990 | McCarthy |
| 4,972,318 A | | 11/1990 | Brown et al. |
| 4,984,155 A | | 1/1991 | Geier et al. |
| 4,992,940 A | | 2/1991 | Dworkin |
| 5,077,665 A | | 12/1991 | Silverman et al. |
| 5,136,501 A | | 8/1992 | Silverman et al. |
| 5,283,731 A | | 2/1994 | Lalonde et al. |
| 5,375,055 A | | 12/1994 | Togher et al. |
| 5,402,336 A | | 3/1995 | Spiegelhoff et al. |
| 5,493,490 A | | 2/1996 | Johnson |
| 5,500,793 A | * | 3/1996 | Deming, Jr. et al. |
| 5,592,375 A | * | 1/1997 | Salmon et al. |
| 5,664,110 A | | 9/1997 | Green et al. |
| 5,664,111 A | | 9/1997 | Nahan et al. |
| 5,664,115 A | * | 9/1997 | Fraser |
| 5,666,493 A | | 9/1997 | Wojcik et al. |
| 5,678,041 A | | 10/1997 | Baker et al. |
| 5,694,551 A | | 12/1997 | Doyle et al. |
| 5,710,887 A | | 1/1998 | Chelliah et al. |
| 5,715,399 A | | 2/1998 | Bezos |
| 5,727,048 A | | 3/1998 | Hiroshima et al. |
| 5,727,163 A | | 3/1998 | Bezos |
| 5,732,400 A | * | 3/1998 | Mandler et al. |

(List continued on next page.)

FOREIGN PATENT DOCUMENTS

JP     02002230331 A  *  8/2002  ........... G06F/17/60

OTHER PUBLICATIONS

No Author "International Barter Corp. to Offer New Internet Barter/Trading System." Business Wire, Jun. 25, 1998. Retrieved from Dialog on Feb. 27, 2002. Retrieved from Dialog File: 16, Accession #: 05656105.*

(List continued on next page.)

*Primary Examiner*—Jeffrey A. Smith
*Assistant Examiner*—Naeem U Haq
(74) *Attorney, Agent, or Firm*—Howrey, Simon, Arnold & White, LLP; Michael J. Bell; Michael J. Stimson (57) ABSTRACT

A method and system is taught for coordinating the exchange of goods between parties over a communications network such as the internet. Users of the system can interact with a central computer to input data regarding items that they offer for exchange, as well as search criteria describing items that they would like to receive in exchange. A processor in the central computer searches records stored in a database to find and sort those records that satisfy the user's search criteria. A second test is then be performed to determine whether the information that the user input describing the item offered for exchange satisfies search criteria within the record. As a result, a match may be generated between two users who have input complementary criteria. The invention can also accommodate more complex exchanges between three or more parties.

51 Claims, 5 Drawing Sheets

U.S. PATENT DOCUMENTS

| | | | |
|---|---|---|---|
| 5,742,931 | A | | 4/1998 | Spiegelhoff et al. |
| 5,745,882 | A | | 4/1998 | Bixler et al. |
| 5,758,328 | A | | 5/1998 | Giovannoli |
| 5,794,207 | A | | 8/1998 | Walker et al. |
| 5,794,219 | A | | 8/1998 | Brown |
| 5,799,284 | A | * | 8/1998 | Bourquin |
| 5,802,497 | A | | 9/1998 | Manasse |
| 5,826,242 | A | | 10/1998 | Montulli |
| 5,842,178 | A | | 11/1998 | Giovannoli |
| 5,845,267 | A | | 12/1998 | Ronen |
| 5,850,446 | A | | 12/1998 | Berger et al. |
| 5,870,733 | A | | 2/1999 | Bass et al. |
| 5,878,416 | A | | 3/1999 | Harris et al. |
| 5,890,138 | A | | 3/1999 | Godin et al. |
| 6,058,417 | A | * | 5/2000 | Hess et al. |
| 6,131,087 | A | * | 10/2000 | Luke et al. |
| 2002/0004759 | A1 | * | 1/2002 | Bradford et al. |

OTHER PUBLICATIONS

No Author "International Barter Corp. Launches New Internet Ubarter.com, E–Commerce Site Today." Business Wire, Jul. 20, 1998. Retrieved from Dialog on Feb. 27, 2002. Retrieved from Dialog File: 16, Accession #: 05715855.*

Lee, Mie–Yun "Tight for cash? Try swapping with barter networks." St. Louis Business Journal, Jan. 8, 1999. Retrieved from the Internet on Feb. 28, 2002 at http://stlouis.bizjournals.com/stlouis/stories/1999/01/11/smallb5.html.*

No Author "Barter system goes modern." Austin Business Journal, vol. 12, No. 8, Apr. 13, 1992. Retrieved from Dialog on Feb. 27, 2002. Retrieved from Dialog File: 148, Accession #: 05861726.* http://www.tradeandswap.com/index.html, Retrieved from the Internet on Sep. 9, 1999.* http://www.tbelle.com/greatexchange/ Retrieved from the Internet on Jun. 4, 1999.* http://www.jatos.com/romance/index.html, Retrieved from the Internet on Aug. 31, 1999.* http://www.heig.com/index.htm, Retrieved from the Internet on Aug. 31, 1999.*

"http://groups.yahoo.com/group/BookSwap/" Downloaded from the Internet on Oct. 5, 2002.*

Brent Stover "Fox, Macklin hope to make book swap website more helpful for students", Nov. 23, 1998. Retrieved from the Internet at "http://www.kstatecollegian.com/issues/v103/fa/n065/news.bookswap.html" on Oct. 5, 2002.*

Trade–N–Swap.com; www.tradeandswap.com/Index; visited Sep. 9, 1999.

The Great Exchange Bookstore; www.tbelle.com/greatexchange; visited Jun. 4, 1999.

TEXbooks—The UT Textbook Exchange; www.cs.utexas.edu/users/emery/TEXbooks/Texbooks.cgi; visited Jun. 4, 1999.

Ash Grove Audiobook Exchange; www.telebyte.com/ashgrove; visited Jun. 4, 1999.

S/M Video Exchange; http//204.208.236.9/Exchange.htm; visited Jun. 4, 1999.

Homeschooler's Curriculum Swap; www.theswap.com; visited Jun. 4, 1999.

ChildrensBookExchange.com; www.childrensbookexchange.com; visited Jun. 4, 1999.

Exbook Company–Exchange Used Book/Textbook; www.exbook.com; visited Jun. 4, 1999.

The Romance Book Exchange; www.jatos.com/romance/index.html; visited Aug. 31, 1999.

R.M.S. Titanic: Book Exchange; www.lv.psu.edu/jkll/titantic/exchange.html; visited Aug. 31, 1999.

The Book Exchange; www.bookexchange.com.au/main.htm; visited Aug. 31, 1999.

Book Exchange and Shopping Services; www.wenet.net/~liquilter/femsf/buysell.html; visited Aug. 31, 1999.

Free Classifieds; www.claremontspeedway.com/classified.htm; visited Aug. 31, 1999.

WDCS Sell, Swap, Trade; www.wdcs.com/sell.html; visited Aug. 31, 1999.

Home Exchange International; www.heig.com/index.htm; visited Aug. 31, 1999.

* cited by examiner

FIGURE 1

(PRIOR ART)

METHOD OF EXCHANGING GOODS OVER THE INTERNET

BACKGROUND OF THE INVENTION

1. Field of the Invention

The present invention relates generally to electronic commerce transactions. Specifically, the invention relates to a method and system for using the internet or similar network to coordinate exchanges of items between parties.

2. Background of the Invention

Before the internet became popular, an individual who wanted to sell or exchange a personal item could do little more than place an advertisement in the "Classifieds" section of the local newspaper. The market would thereby be limited to the newspaper's readership. For those who wished to exchange certain types of commonly-exchanged items ranging from books and CDs to time-shares, clubs formed that allowed members to swap such items amongst themselves. But such clubs were also confined to local areas since the logistics and long distance communication required to arrange frequent exchanges was impractical.

The internet (or "World Wide Web" as it is also commonly known) is a worldwide collection of computers and computer networks cooperating to exchange data using a common software standard. The infrastructure of the internet consists of computers of all sizes and capabilities connected in networks within networks by way of telephone wires, fiber optic cables, and satellite links. The common standard that allows all of these computers to speak the same language is known as the TCP/IP protocol. Through this vast interconnection of computers, internet users can send and receive messages, share computer data, post information for others to view, and access multimedia information including audio and video.

Since the pervasiveness of the internet has exploded to what it is today, a number of methods have been developed to help individuals conduct simple transactions over the internet. For example, computer-based classified ads and electronic bulletin boards exist in great numbers, providing people with places to post their advertisements. A number of systems exist wherein would-be sellers enter ads into a computer-managed database that can be searched by prospective buyers. Online classified ad systems are effective for those who want maximum exposure for their listings since they provide a highly visible place to post ads. Classified ads, however, are best suited for one-time transactions in which the seller is looking to sell her product, and proceeds from the sale can be used to cover the costs of placing the classified ad. Moreover, the classified ad method of conducting business consists of one-sided, seller-driven transactions since the advertising party simply posts an advertisement and waits to be contacted. Consequently, even simple exchanges of items, as between two parties, cannot easily be arranged through classified ads.

Online auctions have become extremely popular of late since the internet facilitates the accepting of bids from anywhere in the world. Many internet sites allow individuals to place virtually any item up for sale to the highest bidder. Several systems exist that employ computers to process bid information from bidders spread over a wide area. Others teach systems for conducting real-time auctions over the internet. The auction-method of transacting business is very efficient and accurate in establishing the value of an object for sale. However, auctions are limited to one-time buying/selling transactions, as the winning bidder is simply the person who agrees to pay the highest price. As with online classified ads, online auctions do not satisfy the needs of people who wish to swap items on a regular basis; nor are they used to offer an item for anything other than cash.

The success of online classified ads and auctions shows how drastically the internet has increased the power individuals have in conducting their personal business. Anyone can take advantage of the internet's global scale to instantly and inexpensively advertise items on a national or worldwide scale. Conversely, people in search of particular items now have vastly more options to choose from. But along with this enormous increase in options come the difficulties associated with efficiently finding and managing them. A person could spend hours online searching through multitudes of items before finding exactly the right item.

A number of systems have been developed to efficiently sort through buying, selling, and exchanging opportunities. The general goal of such efficiency-enhancing search systems is to enable users to quickly and easily find precisely the item they are looking for without having to sift through incredible amounts of clutter. The relevant "user" is almost always a buyer or a seller, but may in some cases, be someone looking to exchange or swap items.

Computer-assisted systems for interactively brokering goods and services between potential buyers and sellers have been proposed. Such systems facilitate buying/selling transactions for a wide variety of goods and services by first storing information about the seller's item, and then assisting buyers in searching the database based on criteria important to the buyer. Seller-driven systems such as these are by far the most common and take many forms including the classified ads and auctions discussed above.

Another system proposed consists of an analogous buyer-driven system. This system generally operates in the form of "want ads" where buyers communicate purchase offers globally to prospective sellers. Sellers may then conditionally accept the offer by way of a central controller computer which receives the bids and communicates them to the buyer for confirmation. A similar proposed system discloses an automated system to assist buyers in locating and purchasing satisfactory goods from a variety of vendors.

Finally, a commerce system may be exchange-driven, rather than buyer or seller driven. The most well known examples of exchanges are stock and commodities exchanges such as the New York Stock Exchange and the Chicago Mercantile Exchange. Exchanges match buyers and sellers through an orderly marketplace, guaranteeing that once an exchange has been agreed to, both parties will perform as expected. Such securities exchanges may be automated.

Automated exchange-type systems have been implemented outside of the securities context, as well. A computer-based system for matching buyers and sellers of property such as real estate, businesses, and other assets has been proposed. Such a system stores records of property to be sold that can be searched based on specific criteria by potential buyers who provide information to the seller regarding their interest in the property. In addition, the system has provisions to screen potential buyers to ensure that they meet certain financial criteria.

While existing exchange systems generally provide a marketplace for persons interested in acquiring and disposing of various items, they generally do not broker exchanges of like items between individuals. The old-fashioned book club where members meet to swap books they have read has not been displaced by the advent of the internet. There is no forum on the internet that allows the local book club to extend its reach, and more importantly, no system for implementing such a forum has been developed. Moreover, existing systems do not actually perform automated matching of multiple parties with complementary criteria.

Consequently, a need exists to provide the average person with the ability and the forum to exchange goods via the internet or similar distributed network. The need exists for a system that actively and automatically matches two or more persons with complementary criteria when the exchange of money is not part of the transaction. The need further exists for a system that would take advantage of the extraordinary reach and efficiency of the internet, while not requiring any special equipment or added expense beyond a standard personal computer. Finally, the need exists for a system that would broker exchanges between individuals in a timely and efficient manner, while maintaining an orderly marketplace by ensuring that all parties are qualified to take part in exchanges.

SUMMARY OF THE INVENTION

Accordingly, the present invention is directed to a system for automatically coordinating exchanges of items between individuals that substantially obviates one or more of the problems due to limitations and disadvantages of the related art.

The present invention encompasses a number of features designed to overcome the deficiencies of prior art systems. It is an object of the present invention to provide a method whereby individuals can use the internet to engage in exchanges with other individuals, regardless of their relative geographic proximity. It is another object of the present invention to provide a system that facilitates such a method of exchanges via the internet by automatically matching exchanges between two or more individuals with complementary criteria thereby eliminating the need for users to manually search; and by allowing users to participate using a standard personal computer and browser software. It is yet another object of the present invention to provide a system for exchanging goods that does not require the maintenance of an inventory of goods. It is another object of the present invention to provide a system that enables exchange clubs to function over the internet by maintaining member information and providing guarantees on exchanges.

These objects, as well as additional features and advantages of the invention, will be set forth in the description which follows, and in part will be apparent from the description, or may be learned by practice of the invention. The objectives and other advantages of the invention will be realized and attained by the methods and apparatus particularly pointed out in the written description and claims hereof, as well as the appended drawings.

The accompanying drawings are included to provide a further understanding of the invention and are incorporated in and constitute a part of this specification. The accompanying drawings illustrate several embodiments of the invention, and together with the description, serve to explain the principles of the invention.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is generally a system that coordinates exchanges of items between individuals without the requirement that money actually change hands. Through an internet site, an individual seeking to take part in a trade can be automatically matched to another individual with a complementary position. For example, Party 1 having Item A and desiring to swap Item A for Item B could be matched by the system to Party 2, who is registered within the system as owning Item B and desiring Item A. The system can also accommodate multi-party exchanges where three or more parties are involved in the exchange.

In its preferred embodiment, the present invention takes advantage of the global presence of the internet by allowing users to interact with the system via an internet site. Although the characteristics and design of the internet site may vary widely, the site essentially provides input fields where users input information about the item they wish to trade, and information about the item or items they wish to acquire. The internet site can display other information including, but not limited to, the results of the system's efforts to arrange a satisfactory match, the status of a user account, and the availability of items for exchange.

By incorporating an internet site as the user interface to the system, the present invention ensures that any user with a computer and internet browser software can take advantage of the invention. Moreover, because users can interact by way of the internet, users need not live close to each other to effect an exchange. Exchanges are coordinated by the system and communicated to the relevant users via the internet. If tangible items such as books are involved, users can then exchange their items through the mail or similar system. For non-tangible items such as time-shares, the electronic record of the agreement may be sufficient to effect the exchange.

The system preferably employs a searchable database to record users' information regarding items possessed and items desired. The extent of other information that must be recorded will depend upon the nature of the items being exchanged. For example, for books, title and author may be all that is required. On the other hand, exchanges of time-shares would typically require information concerning location, amenities, and periods of availability. User information, usually at least name and address, may also be recorded so the exchange can be performed once it has been arranged by the system. In addition, more detailed user information such as a history of transactions may also be stored, thus enabling the system to track user trends and characteristics, and predict future exchanges of interest to the user to increase the efficiency with which the user interacts with the system.

In one embodiment of the present invention, the system may be a feature of an online club (e.g., an online CD exchange club). The club may require that users pay a fee to become members, where the fee is used to guarantee exchanges. For example, if a member entered into an exchange without actually possessing the item he committed to providing, his fee could be used by the club to purchase a new version of the same item so that the other party to the exchange is protected. The club may also add a nominal surcharge to each transaction to maintain the system and promote the club for its own growth. In other embodiments, the system of the present invention maintains an accounting of member fees to ensure that members who engage in exchanges are active, that is, paid in full to date. The system of the present invention may also be part of a club that functions on a point system, where members can be credited or assessed points that may be exchanged at some later time for items in the club's inventory or items possessed by other club members.

As will become apparent, the present invention can be utilized in a broad range of contexts. The items that can be exchanged with the present system include, but are not limited to, books, compact discs, games, videos and movies, collectible articles, event tickets, and time-shares. In addition, the system is not limited to the exchange of like items (i.e., books for books, videos for videos, etc.), and is not limited to the one-for-one exchanges (i.e., one book for one book). The present invention is also not limited to simple exchanges between two parties. The system can be constructed with software that allows exchanges between three or more parties. Generally, the present invention can be employed to exchange any items that lend themselves to being swapped.

Figure 1:
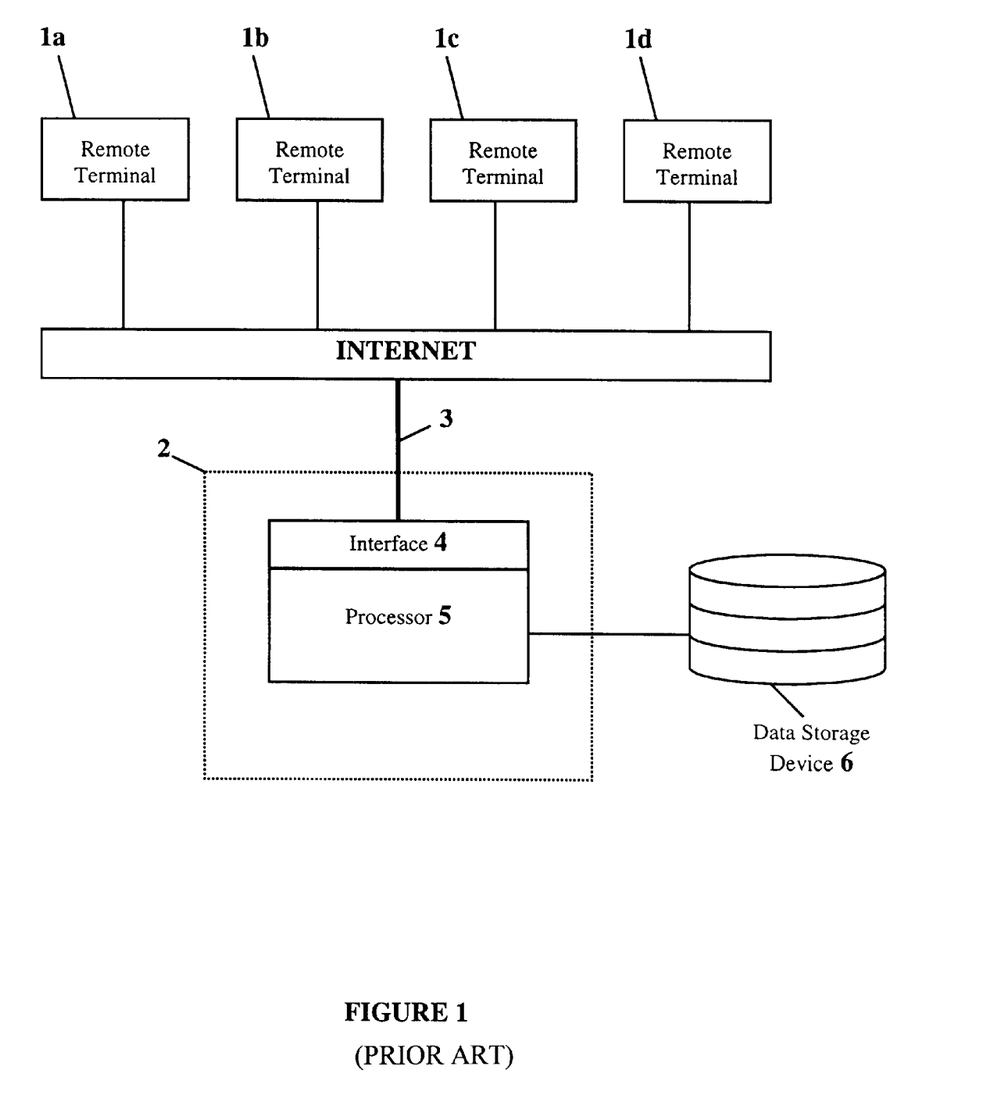
FIG. 1 is a diagram of the general hardware configuration of a first embodiment of the invention.

FIG. 1 shows the general architecture of a first embodiment of the invention. While the present invention is extremely flexible as to the specific characteristics of the architecture that is employed, the general configuration of FIG. 1 is described for illustrative purposes. Specific aspects and characteristics of the invention will be described.

Preferably, Remote Terminals 1a–1d are each connected to the internet by any of a number of well-known network connections including telephone lines, ISDN lines, T1 connections, and the like. Each remote terminal can have its own connection, which must include some type of interface for connecting to a network, such as a modem or network interface card. The exact type of interface required depends upon the connection. In addition, an internet browser is typically needed to send and receive data over the internet in a user-friendly manner. Internet browsers are software applications that provide user-friendly graphical interfaces for viewing data from internet sites and for navigating between sites. There are a great deal of internet browsers on the market, any of which can be used with the present invention as long as they provide the basic data transmitting and receiving functions.

Although the preferred embodiment employs the internet, Remote Terminals 1a–1d need not be connected to the internet to realize the benefits of the present invention. The present invention contemplates any distributed data or communications network that is capable of providing connectivity for data transfer between remote terminals and a central computer system. Moreover, the network connections and interfaces of the remote terminals, while they will typically be of the types described above, may vary depending upon the characteristics of the network involved.

The same is true with respect to central computer system 2. Its network connection 3 to the internet will preferably be an ISDN line, so that it can adequately accommodate the traffic of multiple simultaneous users. However, network connection 3 may consist of any of a wide variety of methods known in the art for connecting to a network. As with the remote terminals, central computer system 2 requires an interface 4 to transmit and receive data through its network connection. The exact nature of interface 4 will depend upon the specific network connection 3 employed.

Processor 5 generally comprises a central processing unit (CPU) and associated memory. The CPU controls interface 4, as well as the transmitting and accepting of data via network connection 3. The CPU also controls data storage device 6, as well as the writing thereto and reading therefrom of data. The associated memory included with the CPU in processor 5 is memory normally present to assist the CPU in performing its functions. Other components may be included as part of central computer system 2 for various purposes such as increasing performance, monitoring activity, and inputting or outputting data.

Data storage device 6 may or may not physically be part of central computer system 2. That is, data storage device 6 may be located adjacent to or even within those components that form central computer system 2. It is not, however, necessary that data storage device 6 be located near central computer system 2. In fact, data storage device 6 need not even be located in the same local area. Networks exist that allow computer systems spread out over wide areas to share common data storage devices. The present invention could be part of such a network sharing a data storage device and the information contained therein. Data storage device 6 may also be any of a wide variety of devices for storing computer data. The most common example would be a hard disk drive. Other possibilities include, but are not limited to, optical disk and tape drives.

Figure 2:
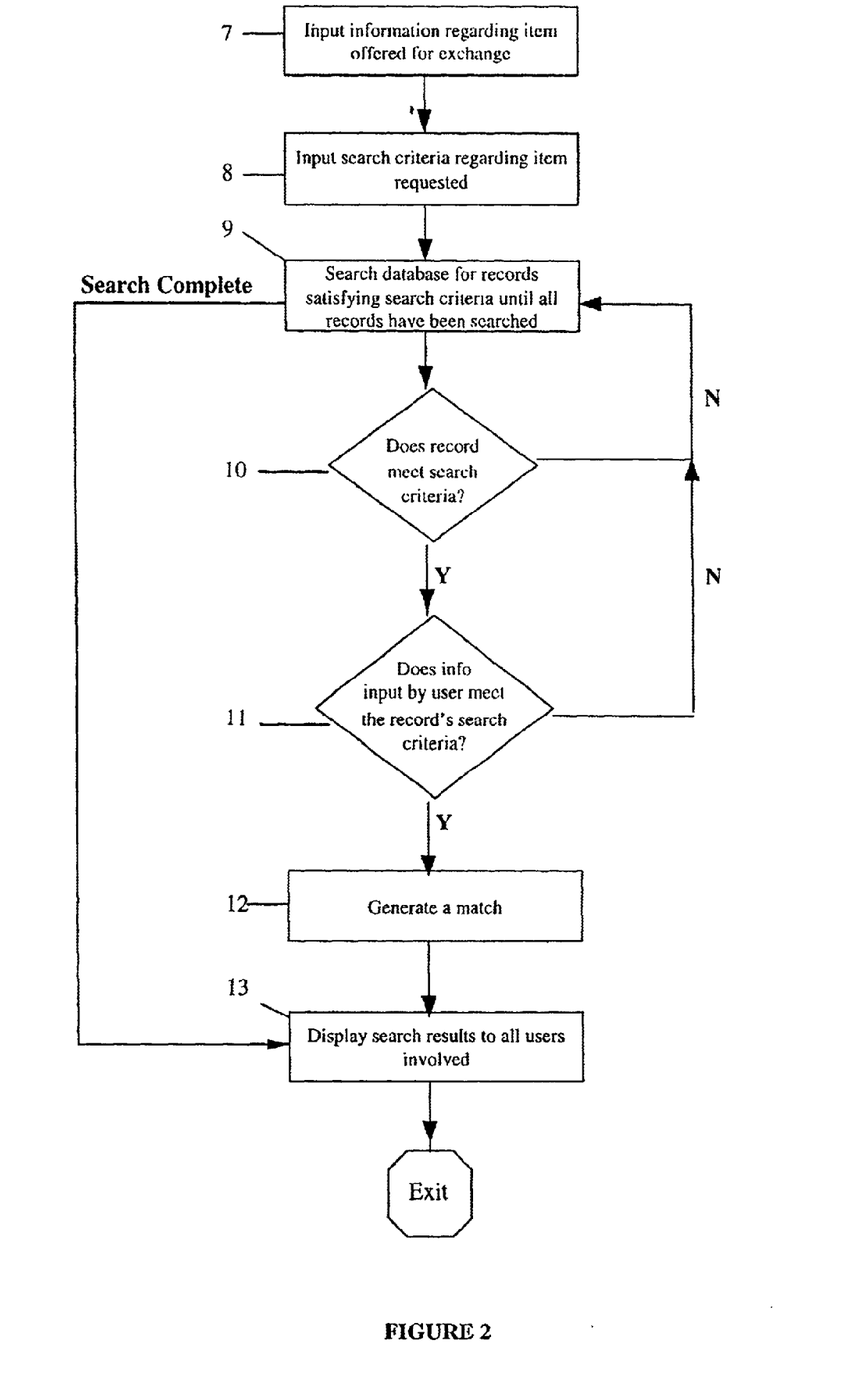
FIG. 2 is a flowchart depicting the steps of the first embodiment of the invention.

Turning now to FIG. 2. This diagram is a flowchart generally outlining the steps involved in practicing the preferred embodiment. As explained above, the user will connect to the central computer via the internet, using an internet browser to locate the appropriate website. Once connected, the user will view the introductory site or "home page" of the website which should provide space for the user to input data to the system and may explain how the system operates. The data necessary to operate the website is maintained at the central computer system and the website's design and content can vary widely.

In the first step 7 of the flowchart of FIG. 2, the user inputs information regarding the item being offered for exchange. If the present invention is being employed as an online book exchange club, for example, the item would be a book and the information input would typically consist of at least the title and author. In some cases, more detailed information such as the edition or year of printing may be necessary to accurately describe the book. In the case of a time-share, more detailed information would be required, such as the location, address, amenities and features, dates of availability, etc. Once the user has input the information, it may be stored immediately, stored later, or not stored at all. If stored immediately, as depicted in box 14 of the alternative embodiment of FIG. 3, a record can be created in the database corresponding to a new entry wherein would be stored the user's item information and information regarding the user, if that information is known at the time. Alternatively, the user's item information may be conditionally or temporarily stored, or perhaps no action would be taken yet. For example, the user's information may not have to be stored until after the search is performed. Alternatively, storage of the user's information may be contingent upon the user entering valid search criteria and/or password.

The second step 8 is for the user to input her search criteria regarding an item she would like to receive in exchange for the item she is offering for exchange. Considering the online book club again as an example, the search criteria may specify an author name if the user is only looking for another book by the same author; or it may include a title or more specific criteria. In the case of time-shares, the search criteria would again have to be more elaborate, possibly including a requisite geographic area, number of bedrooms, or period of availability. Moreover, as explained above, this information may be written to a database record at this point or later. In the preferred embodiment, the website contains fields wherein the user inputs her information and search criteria. The website also contains a <SEND> button, or similar device that initiates the transmission of the information, that allows the user to transmit all the data she has entered to the central computer instantaneously once she is finished entering it. In this case, the information and the search criteria would be stored virtually simultaneously upon receipt at the central computer.

Once the requisite data has been input by the user, the database can be searched for records that satisfy the user's search criteria. Searching occurs in box 9. The search will typically be conducted using data sorting techniques well known in the art and may involve statistically ranking records based upon the extent to which they satisfy the user's search criteria.

In the preferred embodiment, the database would be searched by analyzing existing records in the database to determine the degree to which they satisfy the user's search criteria. In another embodiment, however, a reverse search may be done where the user's information regarding the item she offers for exchange is compared to the search criteria associated with each record in the database to determine whether her item satisfies the search criteria of any existing records. The search criteria of existing records stored in the database will be discussed in more detail below.

Figure 3:
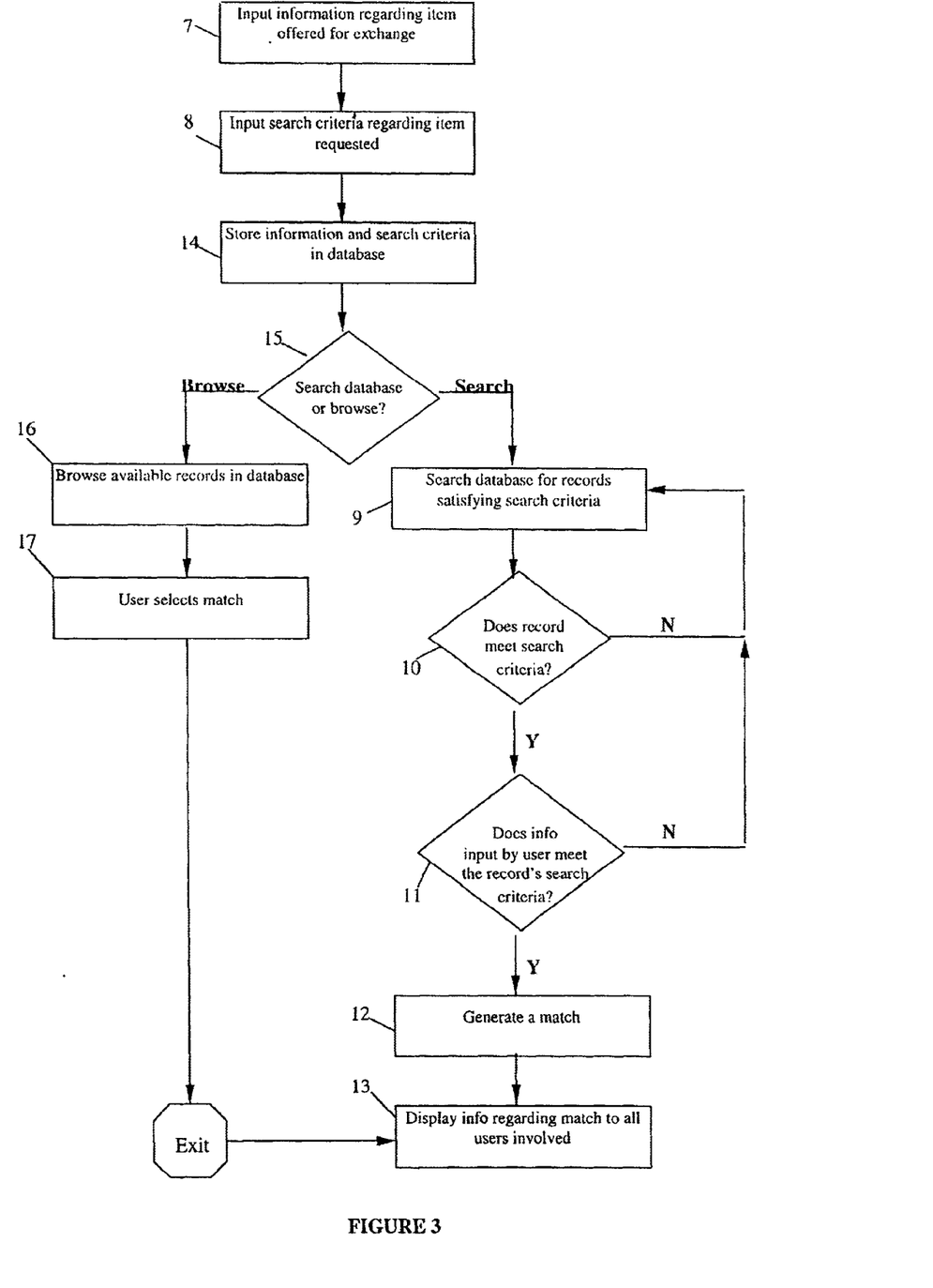
FIG. 3 is a flowchart depicting the steps of an alternative embodiment.

In an alternative embodiment of the invention depicted in FIG. 3, the user may be given a choice 15 between searching the database for matching records, as described above, and browsing the database. The difference is essentially that, in searching, the user is inputting search criteria and allowing the system to automatically review all of the records in the database to determine which, if any, satisfy the user's criteria. Browsing, on the other hand, involves the user manually reviewing the records of the database 16. If the user opts to browse the database 16, she may review records and select a desirable one as a match 17.

Another possible embodiment employs a hybrid of searching and browsing where the system allows the user to choose a category of records to browse, thereby eliminating the need to browse every record. For example, the system may define categories of books such as Shakespearean plays, Charles Dickens novels, and romance novels. This modified browsing technique allows users to look at all of the records within a well-defined category based on author, subject matter, or other classification. As a result, a user can manually review a subset of records for something appealing when the user does not exactly know enough of what she is looking for to input accurate search criteria.

In another embodiment of the present invention, a more sophisticated and efficient artificial intelligence searching technique may be used wherein the system accumulates detailed user information regarding past transactions and areas of interest. This information can then be used by the system to track trends regarding individual users and broader categories of users. Trending information can be used to predict future transactions of interest to particular users. Such a system would result in more efficient user interaction because users can quickly be steered to transactions that are most likely to be of interest, or users may be automatically informed by the system of potential exchanges. For example, the system would receive information from a user and then, based upon stored user information and using artificial intelligence techniques known in the art, the system can notify users that there has been a recent posting to the system that may be of interest.

Users may be required to enter a password before gaining accessing to the system or before being allowed to take advantage of certain functions of the system. Password validation may be employed at virtually any point in the process. It may be desirable to require password validation before the system will accept any input from the user. However, it need not occur at the beginning. For example, data and search criteria may be received and conditionally stored before the user must undergo password validation. In another embodiment, the system may accept data and search criteria from users and allow users to search the database, but not actually generate a match or display information unless the user proves that she is a member of the club by inputting a valid password. Password access to the system allows the system to be used like an exclusive club.

Considering the time-share example mentioned above, the operator of the central computer and website may intend to implement the system as an online travel club where users pay a fee to become members of the club. Once a user has become a member, she is qualified to offer her time-share for exchange and search the database for other time-shares that are desirable to her. The membership fee may then be used in a variety of ways, such as to maintain the central computer and website or to promote the club and expand its membership. Alternatively or in addition to the membership fee, the club operator may charge a transaction fee where users are charged a fee on completed exchanges.

Returning to the flowchart of FIG. 2, in searching the database for appropriate matches for exchange, processor 5 will analyze the records present in the database to determine whether any records satisfy the user's search criteria, as depicted in box 10. In the preferred embodiment, the processor will search the database by scrolling through the records and analyzing each in view of the user's search criteria. However, as explained above, there are many data searching and sorting techniques known in the art. Each record may be assigned a statistical ranking according to the degree to which it satisfies the user's search criteria. If a number has been chosen as the pass/fail line, determining whether a particular record meets the user's search criteria is then simply a question of determining whether its statistical ranking falls below or above that line. For example, the system may be programmed to consider any record with less than an 80% statistical ranking as failing to meet the user's search criteria. In that case, according to the flowchart of FIG. 2, records not meeting the 80% standard will cause processor 5 to proceed to the next record. This is depicted as the "No" path from box 10 to box 9.

If a particular record meets the user's search criteria, the next step 11 is to determine whether the item that the user is offering for exchange satisfies the other party's request. For example, assume a user offers for exchange the movie *The French Connection* and enters search criteria indicating that he would like to exchange *The French Connection* for any murder mystery novel. Assume also that, during a search, the processor encounters a record wherein a second user has indicated that she owns the murder mystery novel *Worst Fears Realized* by Stuart Woods and her search criteria indicate that she wants to exchange that book for another book that is currently on the New York Times Best Seller list. In that case, the record meets the first user's search criteria in box 10; however, box 11 is not satisfied because the movie *The French Connection* is not a book on the New York Times Best Seller list. Consequently, the test of box 11 would be failed and the processor would return to box 9 to continue searching until there were no more records to be searched. Only if the tests of both box 10 and box 11 are passed will the system generate a match 12.

The process of generating a match is generally a simple one. In the preferred embodiment, this step involves first marking the record as a potential match. This marking may consist of writing a designated value to a field in the record reserved for marking the record as a match. The marking may also include the statistical ranking assigned to the record during the search. Once a record is marked as a match, the system may be programmed to continue searching until it has reviewed every record; or the system may be programmed to stop once it has found a matching record with a predetermined statistical ranking. If the system is programmed to review every record, a list can be produced for the user upon completion of the searching process listing all of the records (e.g., in order based upon their statistical ranking).

Figure 4:
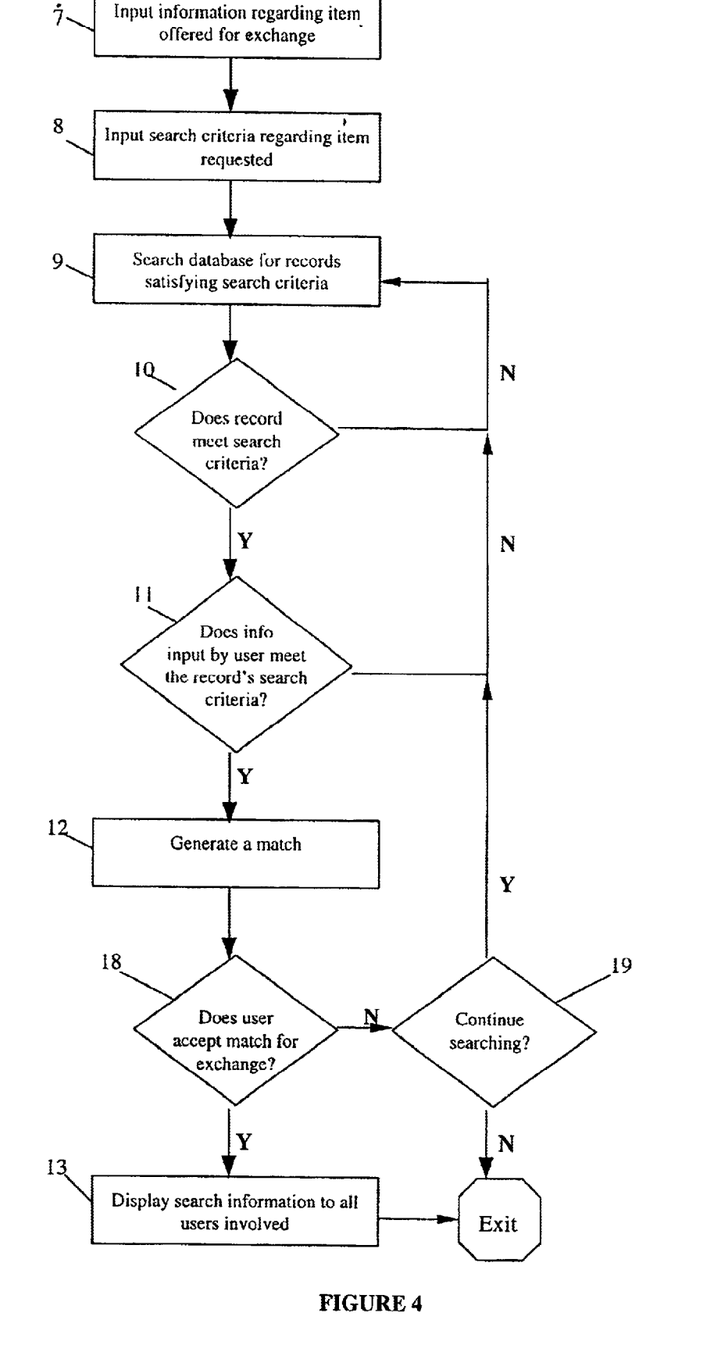
FIG. 4 is a flowchart depicting the steps of an alternative embodiment.

The flowchart of FIG. 4, shows another embodiment of the present invention whereby the user is given the power to accept or reject matches generated by the system, shown in box 18. For example, assume a user inputs search criteria specifying that she would like to exchange her time-share in Hawaii for a time-share in the Caribbean. If a record is found in the database offering a time-share in Jamaica, this will pass the test of box 10. Therefore, assuming box 11 is also passed, a match will be generated. According to the flowchart of FIG. 4, the user may then be offered a choice of whether she accepts or declines the match. If she has already been to Jamaica and would prefer a time-share on another Caribbean island, she may decline the match and choose to exchange time-shares with a different user. In that case, the system would proceed on through box 19 and continue searching.

Figure 5:
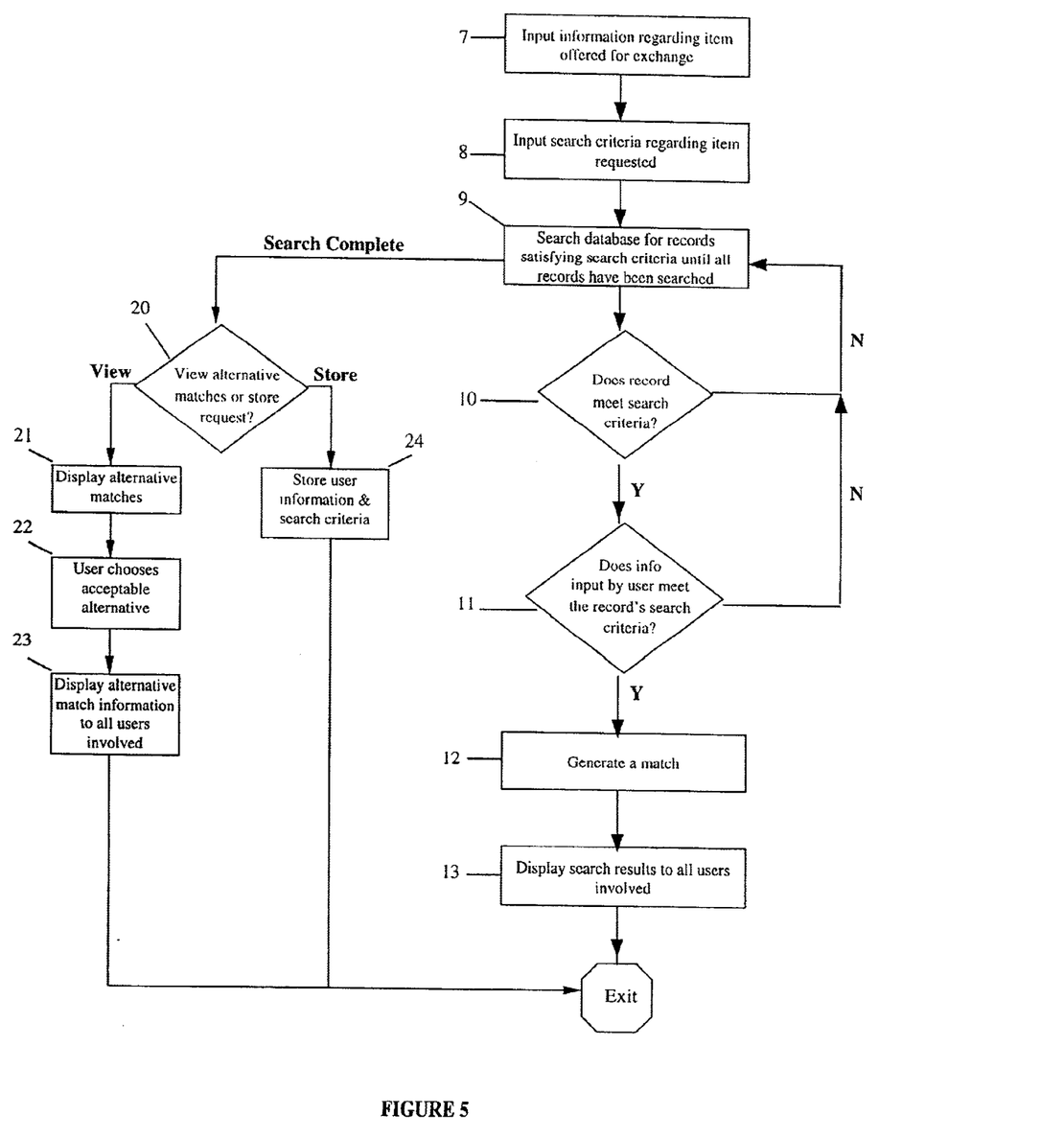
FIG. 5 is a flowchart depicting the steps of an alternative embodiment.

If no records satisfy the user's search criteria, the system may inform the user that there are currently no matches for her request, and provide the user with the option of either selecting an alternative match (i.e., one that is close to satisfying the user's search criteria) or storing her request in the database to await future matching. This scenario is depicted in the flowchart of FIG. 5. If the user opts in box 20 to select an alternative match, she could be presented with a list of records that approximately satisfy her search criteria 21. For example, the system may be programmed to offer as alternative matches, records that have a statistical ranking greater than 50 percent. Consequently, if there were no immediately acceptable matches—for example, matches with a statistical ranking of 80 percent or more—the system would respond by providing a list of those records that were slightly below 80 percent matching. The user may then select an acceptable alternative match 22 or choose to accept no match. If the user selects an acceptable alternative match 22, the alternative match information is displayed to all users involved in the exchange 23. If the user instead opts to post her request in the database for future matching 24, the record in which her data was stored will remain in the database for future users to search.

Once a match has been generated and, if applicable, accepted by the user, both parties involved will be notified 13. Parties may be notified, for example, by displaying the information on the system's website or by sending an e-mail message to the users. The notification itself should include sufficient information such that the parties can thereafter execute the exchange. At a minimum, such information will probably include the other user's name and address so that the parties can exchange their items through the mail. Telephone numbers may also be provided if necessary for the parties to finalize their exchange. The exact information needed to inform the users will depend upon the context in which the present invention is being implemented. In another embodiment, such information may include a user identification of some sort such as a screen name, login name or other unique personal identifier, if users do not need or want to use their real names. It is also possible to make displaying of match information contingent upon the user accepting the record as a match, or perhaps upon entering a valid password, as explained above. The user information that is provided as part of the step of notifying the users may itself be included within the record selected as a match, or it may be stored separately, such as in a separate member file, and associated with the record. If the present invention is implemented as an online book exchange club, members may be listed with their address and telephone numbers in a membership file, while their postings are listed in a separate database. Such an arrangement would enable the system to separately keep track of active and inactive members. It would also allow members to place multiple requests in the database so that they could be involved in multiple independent transactions simultaneously.

While the preferred embodiment of the present invention is directed towards exchanges where two users swap items with each other, with additional programming, the system can be made to arrange exchanges involving three or more parties. If a search is completed based on a first user's search criteria but yields no exact matches, the system can be programmed to produce approximate matches, as described above. The processor may then do an analysis of the approximately matching records to determine whether any two or more records in combination satisfy the user's search criteria. For example, in an implementation of the present invention as an online music club that exchanges CDs currently on the Billboard™ Top 200 Albums, assume a first user offers the music CD "Supernatural" by Santana and inputs search criteria specifying that she would like to exchange that CD for "Devil Without A Cause" by Kid Rock. During the processor's search of the database records, it comes across a record wherein a second user has indicated that he possesses "Devil Without A Cause" and would like to exchange it for "Mirrorball" by Sarah McLachlan. Depending upon the exact characteristics of the system's sorting techniques, the processor may assign this record a statistical ranking somewhere between 50 and 80 percent since it contains information related to "Devil Without A Cause". It therefore satisfies the first user's criteria, but does not have its own criteria satisfied. Consequently, it is not a perfect match, but it can be been designated a potential alternative match. If the processor also encounters a record wherein a third user has indicated that she owns "Mirrorball" and would like to exchange it for "Supernatural", this record also will be designated a potential alternative match since it contains information regarding one of the first user's criteria, namely "Supernatural". Once all the records have been searched and no perfect match has been found, the processor will perform an additional analysis step in which it finds that the two records, each of which only partly satisfying the first user's search criteria, completely satisfy the first user's criteria when taken together. Following the processor's arrangement of this 3-way exchange, the three users will be notified in the manner described above and instructed where to send their CDs to perfect the exchange.

From the preceding example of a 3-way exchange it should be apparent that, with minimal modification, the system can be programmed to accommodate a wide variety of items for exchanging in a wide variety of contexts. The preceding examples have been presented strictly illustrative purposes and in no way are intended to limit the possible applications of the present invention. There is no need to limit use of the present invention to simple exchanges of books for books, CDs for CDs, and so on. The system's programming can easily be made to arrange more complex transactions. In addition, transactions involving four or more parties could also be coordinated given software that is robust enough to do so. As a result, it should be apparent from the preceding description and examples that the concepts of the present invention have great potential for application beyond the examples presented herein.

I claim:

1. A method for coordinating an exchange of items between individuals over a communications network, said method comprising:

providing, maintaining, and updating a preexisting list of like items being offered for exchange, wherein the steps of providing, maintaining, and updating are performed by a third party;

receiving a first data entry identifying a first offered item being offered for exchange by a first user, wherein the first data entry comprises the first user's selection of the first offered item from the preexisting list of like items being offered for exchange;

receiving first search criteria identifying a first desired item to be received in exchange for the first item by the first user, wherein the first search criteria is generated by the first user's selection of the first desired item from the preexisting list of like items being offered for exchange;

storing the first data entry and the first search criteria in a database component of a central computer system;

receiving a second data entry identifying a second offered item being offered for exchange by a second user, wherein the second data entry comprises the second user's selection of a second offered item from the preexisting list of like items being offered for exchange;

receiving second search criteria identifying a second desired item to be received in exchange for the second item by the second user, wherein the second search criteria comprises the second user's selection of the second desired item from the preexisting list of like items being offered for exchange;

searching the database in accordance with the second search criteria and the second data entry;

generating a match if the first data entry satisfies the second search criteria and if the second data entry satisfies the first search criteria;

informing the second user whether a match has been generated; and storing the second data entry and the second search criteria in the database if no match has been generated.

2. The method of claim 1 wherein said step of storing the first data entry and the first search criteria further comprises storing information related to the first user and associating the information with the first data entry and the first search criteria.

3. The method of claim 1 further comprising the step of storing the second data entry and the second search criteria in the database.

4. The method of claim 3 wherein said step of storing the second data entry and the second search criteria further comprises storing information related to the second user and associating the information with the second data entry and the second search criteria.

5. The method of claim 3 wherein the second user is a member, and wherein only members may have the second data entry and the second search criteria stored in the database.

6. The method of claim 5 wherein at least one of said step of receiving a second data entry, said step of receiving second search criteria, and said step of storing the second data entry and the second search criteria, is contingent upon the second user inputting a valid password.

7. The method of claim 5 wherein the second user becomes a member by paying a fee.

8. The method of claim 1 wherein the first and second users receive data from and transmit data to the central computer system via the internet.

9. The method of claim 8 wherein the first data entry and the first search criteria are input by the first user through an internet browser software interface.

10. The method of claim 8 wherein the second data entry and the second search criteria are input by the second user through an internet browser software interface.

11. The method of claim 1 wherein said step of informing the second user further comprises:

notifying the first user of some identification data regarding the second user, wherein the identification data comprises at least one of the second user's (1) name, (2) address, (3) pseudonym, (4) telephone number, and (5) unique user identifier; and notifying the second user of some identification data regarding the first user, wherein the identification data comprises at least one of the first user's (1) name, (2) address, (3) pseudonym, (4) telephone number, and (5) unique user identifier.

12. The method of claim 11 further comprising the step of receiving an acceptance of the generated match as acceptable for exchange from at least one of the first and second users, wherein at least one of said step of notifying the first user and said step of notifying the second user is contingent upon said step of receiving an acceptance.

13. The method of claim 12 wherein the generated match is made unavailable for further selection once at least one of the first user and the second user accepts the generated match as acceptable for exchange.

14. The method of claim 1 wherein the preexisting list of like items consists of like items selected from the group consisting of: a book, a compact disc, a video, a game, and a computer software program.

15. The method of claim 1 wherein the first user is a member, and wherein only members may have the first data entry and the first search criteria stored in the database.

16. The method of claim 15 wherein at least one of said step of receiving a first data entry, said step of receiving first search criteria, and said step of storing the first data entry and the first search criteria, is contingent upon the first user inputting a valid password.

17. The method of claim 15 wherein the first user becomes a member by paying a fee.

18. The method of claim 1 wherein said step of generating a match comprises generating a partial-match if the first data entry partly satisfies the second search criteria, wherein a plurality of partial-matches are generated, and wherein the plurality of partial-matches as a whole completely satisfies the second search criteria.

19. The method of claim 1 wherein said step of generating a match comprises generating a partial-match if the second data entry partly satisfies the first search criteria, wherein a plurality of partial-matches are generated, and wherein the plurality of partial-matches as a whole completely satisfies the first search criteria.

20. The method of claim 1 wherein said step of informing the second user whether a match has been generated comprises informing the second user that no match has been generated, and offering the second user at least one of an alternative exchange and an option to store the second search criteria for later matching.

21. A system for coordinating the exchange of items between individuals via a communications network, said system comprising:
   a central computer;
   a plurality of remote terminals, each of said remote terminals having input devices for entering data;
   a data communication network providing a signal path for data exchange between said central computer and said plurality of remote terminals;
   a processor located at said central computer;
   an interface located at said central computer, said interface being controlled by said processor, wherein said interface is capable of providing data to and receiving data from said remote terminals;
   a data storage device connected to said central computer, said data storage device being controlled by said processor, and said data storage device storing data records comprising information related to at least one of: items offered for exchange, requests for items to be exchanged, descriptions of items, and user identification; and
   a preexisting list of like items being offered for exchange that is provided, maintained, and updated by a third party;
   said central computer receiving a data entry identifying an item offered for exchange that is on the preexisting list of like items being offered for exchange and search criteria relating to a desired item requested for exchange that is on the preexisting list of like items being offered for exchange input at one of said plurality of remote terminals by a first user, the search criteria generated by the first user's selection of an item from the preexisting list of like items being offered for exchange;
   said processor analyzing the data records to determine whether the received search criteria are satisfied by information contained in the data records provided by a second user who previously identified an item offered for exchange and a desired item, both from the list of like items, and said processor further analyzes the data records to determine whether search criteria associated with the data records are satisfied by the received data entry;
   said processor selectively retrieving a data record that: (1) satisfies the received search criteria of the first user, and (2) is satisfied in its search criteria by the received data entry; and
   said processor providing information contained in the selectively retrieved record to the first user.

22. The system of claim 21 wherein said remote terminals are computers, and users at said remote terminals input and receive data from said central computer via an internet browser software interface.

23. The system of claim 21 wherein said processor comprises a central processing unit and associated memory.

24. The system of claim 21 wherein said data storage device comprises a hard disk drive, and the data records are stored in a database stored on said hard disk drive.

25. The system of claim 21 wherein the information contained in the selectively retrieved record comprises information related to at least one of (1) an item description, (2) item availability, and (3) conditions on use of an item.

26. The system of claim 21 wherein the information contained in the selectively retrieved record comprises at least one of a (1) name, (2) address, (3) pseudonym, (4) telephone number, and (5) unique user identifier, associated with a second user.

27. The system of claim 26 wherein the processor provides the information contained in the selectively retrieved record only after the first user accepts the selectively retrieved record as a match for exchange.

28. The system of claim 27 wherein the processor makes the selectively retrieved record unavailable for further selection once the first user accepts the selectively retrieved record as a match for exchange.

29. The system of claim 21 wherein the first user must enter a valid password before the system will accept the input of data relating to an item offered for exchange and search criteria relating to a desired item requested for exchange.

30. The system of claim 21 wherein the list of like items consists of like items selected from the group consisting of: a book, a compact disc, a video, a game, and a computer software program.

31. The system of claim 21 wherein said processor selectively retrieves a plurality of data records, wherein each of the plurality of data records partly satisfies the search criteria, and the plurality of data records as a whole completely satisfies the search criteria.

32. The system of claim 21 wherein said processor selectively retrieves a data record that partly satisfies the search criteria, and wherein the first user is informed that no match has been generated, and offered at least one of an alternative exchange and an option to store the search criteria for later matching, wherein the alternative exchange comprises information related to the data record that partly satisfies the search criteria.

33. A method for conducting an online exchange club wherein users access a central computer via a communications network, store in a database associated with the central computer information identifying items they would like to exchange with other users and items they would like to receive in exchange, and wherein the central computer automatically matches users who have input complementary information, said method comprising:
   providing access to a central computer via a communications network;
   providing, maintaining, and updating a preexisting list of like items being offered for exchange, wherein the steps of providing, maintaining, and updating are performed by a third party;
   receiving a data entry from a first user identifying an item offered for exchange, wherein the data entry is comprised of the first user's selection of an item from the preexisting list of like items being offered for exchange;
   receiving search criteria from the first user identifying an item from the preexisting list of like items being offered for exchange;

searching records in a database associated with the central computer for information that satisfies the search criteria, wherein the information comprises a data entry from a second user identifying an item offered for exchange and a desired item to be received in exchange, both items selected from the preexisting list of like items;

analyzing the records to determine whether the received search criteria are satisfied by information contained in the records;

analyzing the records to determine whether search criteria associated with the records are satisfied by the received data entry;

selectively retrieving a record that: (1) satisfies the received search criteria, and (2) is satisfied in its search criteria by the received data entry; and displaying information related to the selectively retrieved records.

34. The method of claim 33 wherein the received data entry and search criteria are stored in the database.

35. The method of claim 33 wherein the data entry and search criteria are inputted through an internet browser software interface.

36. The method of claim 33 wherein said step of searching records in a database is performed in accordance with the received search criteria.

37. The method of claim 33 wherein said step of searching records in a database is performed based upon the received data entry.

38. The method of claim 33 wherein said step of selectively retrieving records comprises selectively retrieving a plurality of records, wherein each of the plurality of records partly satisfies the search criteria, and the plurality of records as a whole completely satisfies the search criteria.

39. The method of claim 33 further comprising the step of receiving an acceptance from the user of a selectively retrieved record as an acceptable match for exchange.

40. The method of claim 39 further comprising the step of making the selectively retrieved record unavailable for further selection.

41. The method of claim 33 wherein said step of displaying information further comprises notifying the user of some identification data regarding another user associated with the selectively retrieved record, wherein the identification data comprises at least one of a (1) name, (2) address, (3) pseudonym, (4) telephone number, and (5) unique user identifier.

42. The method of claim 33 wherein the user is a member, and wherein at least one of said step of providing access to a central computer, said step of receiving a data entry, said step of receiving search criteria, said step of searching records in a database, said step of selectively retrieving records, and said step of displaying information, is contingent upon the user being a member.

43. The method of claim 42 wherein at least one of said step of providing access to a central computer, said step of receiving a data entry, said step of receiving search criteria, said step of searching records in a database, said step of selectively retrieving records, and said step of displaying information, is contingent upon the user inputting a valid password.

44. The method of claim 42 wherein the user becomes a member by paying a fee.

45. The method of claim 33 wherein said step of selectively retrieving records comprises selectively retrieving records that partly satisfy the received search criteria and designating those records as alternative matches, and wherein said step of displaying information comprises informing the user that no match has been generated and offering the user at least one of information regarding the alternative matches and an option to store the search criteria for later matching.

46. The method of claim 33 wherein the list of like items consists of items selected from the group consisting of: a book, a compact disc, a video, a game, and a computer software program.

47. The method of claim 33 wherein both the item being offered for exchange and the item desired in exchange are books.

48. The method of claim 33 wherein both the item being offered for exchange and the item desired in exchange are compact discs.

49. The method of claim 33 wherein both the item being offered for exchange and the item desired in exchange are videos.

50. The method of claim 33 wherein both the item being offered for exchange and the item desired in exchange are games.

51. The method of claim 33 wherein both the item being offered for exchange and the item desired in exchange are computer software programs.

* * * * *